United States Patent
Creamer et al.

(10) Patent No.: US 7,007,063 B2
(45) Date of Patent: *Feb. 28, 2006

(54) SERVER SIDE PROGRAM INTERFACE TO SERVICE LOGIC EXECUTION ENVIRONMENT

(75) Inventors: Thomas E. Creamer, Boca Raton, FL (US); Zygmunt A. Lozinski, Winchester (GB); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 714 days.

This patent is subject to a terminal disclaimer.

(21) Appl. No.: 09/864,696

(22) Filed: May 24, 2001

(65) Prior Publication Data

US 2002/0178294 A1 Nov. 28, 2002

(51) Int. Cl.
*G06F 15/16* (2006.01)
(52) U.S. Cl. ........................ 709/203; 709/240
(58) Field of Classification Search ........... 709/203, 709/218, 219, 229, 240
See application file for complete search history.

(56) References Cited

U.S. PATENT DOCUMENTS

| 6,085,030 A * | 7/2000 | Whitehead et al. ......... 709/203 |
| 6,178,438 B1 * | 1/2001 | Tschirhart et al. .......... 709/200 |
| 6,324,275 B1 * | 11/2001 | Yagel et al. ........... 379/201.03 |
| 6,480,890 B1 * | 11/2002 | Lee et al. .................... 709/223 |
| 6,873,695 B1 * | 3/2005 | Celi et al. .............. 379/201.12 |

* cited by examiner

*Primary Examiner*—Ario Etienne
*Assistant Examiner*—Emmanuel Coffy
(74) *Attorney, Agent, or Firm*—Akerman Senterfitt

(57) ABSTRACT

An advanced intelligent network according to the present invention can include a service logic execution environment (SLEE). The SLEE can include an event handler for routing messages between and among client components and service components. The advanced intelligent network further can include at least one service component configured to post and receive messages to and from other service components in the SLEE through the event handler. At least one Internet enabled service component (IESC) executing in the SLEE also can be included. The IESC can be configured to post and receive messages to and from other service components in SLEE through the event handler. The IESC can be communicatively linked to a server side program external to the SLEE.

23 Claims, 3 Drawing Sheets

SERVER SIDE PROGRAM INTERFACE TO SERVICE LOGIC EXECUTION ENVIRONMENT

BACKGROUND OF THE INVENTION

1. Technical Field

This invention relates to the field of telecommunications, and more particularly, to an interface for accessing a service logic execution environment from a server side program.

2. Description of the Related Art

The development of the open network application programming interface (API) represents an important departure from traditional methods for opening the architecture of the public switched telephone network (PSTN). Presently, the Advanced Intelligent Network (AIN) architecture defines a call model which allowes the creation of telecommunications service applications outside of the switch environment. Telecommunications service applications are a la carte telecommunications applications which can perform enhanced services for a telecommunications session established among two or more parties. Exemplary service applications can include Call Waiting, Caller ID, Call Forwarding, Voice Activated Dialing, and Meet-me Conferencing.

When AIN first had been introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications developed to the AIN specification are written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will become more similar to that in software and information technology in general, with customers reaping the benefits of increased competition, reduced time to market, and the rapid leveraging of new technology as it is developed.

To make this vision a reality, the principles of AIN have been discarded in favor of a new service application component development paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java APIs for Integrated Networks (JAIN) fulfills the requirements of the new service application component development paradigm. Presently, JAIN includes standard, open published Java APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. These protocols can include TCAP, ISUP, INAP, MAP, SIP, MGCP, and H.323. The JAIN implementation also can include a signaling layer 103 which can include interfaces to provide connectivity management and call control. The conventional JAIN implementation also can include an application layer 104 for handling secure network access and other external services. Finally, the conventional JAIN implementation can include a service layer 106 which can include a service creation and carrier grade service logic execution environment (SLEE) 108.

In JAIN, the protocol layer 102 and the signaling layer 103 are based upon a Java standardization of specific signaling protocols and provide standardized protocol interfaces in an object model. Additionally, applications and protocol stacks can be interchanged, all the while providing a high degree of portability to the applications in the application layer using protocol stacks from different sources. By comparison, the application layer 104 provides a single call model across all supported protocols in the protocol layer 102. Fundamentally, the application layer 104 provides a single state machine for multiparty, multimedia, and multiprotocol sessions for service components in the application layer 104. This state machine is accessible by trusted applications that execute in the application layer 104 through a call control API.

Notably, applications or services executing at the service level 102 can communicate directly with protocol adapters in the SLEE 108. Protocol adapters typically are class methods, callbacks, event or interfaces that encapsulate the underlying resources such as TCAP, MGCP, etc. The underlying resources can be implemented in many programming languages, but a JAIN-conformant protocol product must provide at least the relevant JAIN API. In contrast, an external application or service executing in the application layer 104 does not have to be aware of the underlying resources and can remain oblivious to the fact that some of its session or call legs may be using different protocols.

Service components 112 are the core JAIN components and can execute in the SLEE 108. More particularly, service components 112 are constructed according to a standard component model and, instantiations of component assemblies can execute in coordination with the SLEE 108. Using information regarding the protocol layer 102 which can be incorporated into the SLEE 108, service components 112 can interact with the underlying protocol stacks without having specific knowledge of the protocol stack. Thus, service components 112 can use the call model provided by the signaling layer to implement telephony services. More importantly, the SLEE 108 can relieve the service components 112 of conventional lifecycle responsibilities by providing portable support for transactions, persistence, load balancing, security, and object and connection instance pooling. In this way, the service components 112 can focus on providing telephony services.

Despite the advantages afforded by JAIN, presently, communicating with a service component in the SLEE can be problematic for external applications. In particular, an external application must be programmatically bound to those service components in the SLEE with which the external application can communicate. This problem can be compounded where the external application is distributed across a computer communications network such as the Internet. Accordingly, any attempt to integrate services or other functionality available via the Internet, including the World Wide Web, must be implemented using a separate, proprietary system.

SUMMARY OF THE INVENTION

The invention disclosed herein addresses the inherent deficiencies of the prior art by providing an interface to external applications for accessing service components in a service logic execution environment (SLEE). In particular, the interface can be used in coordination with a server-side program or script executing in a network server such as a Web server. In accordance with the inventive arrangements, external applications can communicate with a Web server across a computer communications network such as the Internet. In particular, external applications can interact with server-side programs or scripts, for example servlets, which can establish communications links with a specially configured service component in the SLEE.

The specially configured service component can act as a conduit between other service components in the SLEE and the external application. Specifically, messages received in the specially configured service component can be posted to an event handler in the SLEE which, in turn, can route the posted messages to target service components. Correspondingly, messages from the target service components can be posted to the event handler in the SLEE which in turn can route the messages to the specially configured service component. The specially configured service component, in turn, can forward the messages to the external application via the server-side program. Thus, service components in the SLEE can freely communicate with an external application without having been programmatically bound to the external application.

One aspect of the present invention can include an advanced intelligent network configured in accordance with the present invention. In particular, an advanced intelligent network according to the present invention can include a SLEE. The SLEE can include an event handler for routing messages between and among client components and service components. At least one service component configured to post and receive messages to and from other service components in the SLEE through the event handler can be included. At least one Internet enabled service component (IESC) executing in the SLEE also can be included. The IESC can be configured to post and receive messages to and from other service components in the SLEE through the event handler. The IESC can be communicatively linked to a server side program external to the SLEE.

Another aspect of the present invention can include an IESC for use with a SLEE in a telephony environment. The IESC can include at least one client service instance. Each client service instance can correspond to an Internet service application. The client service instance can include a content interface for publishing an interface to the client service instance. A service wrapper can be included. The service wrapper can provide a common interface to the at least one client service instance. The service wrapper can route events between the SLEE and the at least one client service instance. The service wrapper can include a service interface for publishing an interface to the service wrapper. The service wrapper also can include a protocol stack for managing communications in the telephony environment and a deployment descriptor for providing configuration information to the SLEE. The IESC can interact with other generic service components, external applications, service components, as well as protocol stacks.

Another aspect of the invention can include a method for providing an external interface to a SLEE comprising an event handler for routing messages between service components executing in the SLEE. The method can include an IESC registering with the SLEE and the IESC receiving a first event routed by the SLEE. The first event can correspond to an Internet service application which the IESC has registered to receive from the SLEE. Also, the first event can be from a protocol stack, a generic service component, a service component, or an external server side program associated with the Internet service application.

The method further can include establishing a communications link between the IESC and the Internet service application. At least one client service for communicating with the Internet service application can be instantiated and can interact with the Internet service application. A second event can be posted to the SLEE responsive to the interaction between the client service instance and the Internet service application. The second event can correspond to the interaction.

Yet another aspect of the invention can include a machine readable storage, having stored thereon a computer program having a plurality of code sections executable by a machine for causing the machine to perform a series of steps. The steps can include an IESC registering with a SLEE. The SLEE can include an event handler for routing messages between service components executing in the SLEE. The IESC can receive a first event routed by the SLEE. The first event can correspond to an Internet service application which the IESC has registered to receive from the SLEE. Further the first event can be from a protocol stack, a generic service component, a service component, or an external server side program associated with the Internet service application.

The method also can include establishing a communications link between the IESC and an Internet service application. At least one client service instance for communicating with the Internet service application can be instantiated and interact with the Internet service application. A second event can be posted to the SLEE responsive to the interaction between the client service instance and the Internet service application. The second event can correspond to the interaction.

BRIEF DESCRIPTION OF THE DRAWINGS

There are shown in the drawings embodiments of which are presently preferred, it being understood, however, that the invention is not so limited to the precise arrangements and instrumentalities shown.

DETAILED DESCRIPTION OF THE INVENTION

The invention disclosed herein concerns a method and system for providing an interface between an Internet service application and a service logic execution environment (SLEE). In particular, a service component in the SLEE can be pre-configured to communicate with an external server-side program such as a servlet or script. Examples of server side programs can include, but are not limited to, Common Gateway Interface (CGI), Perl scripts, Java™ Server Pages, VB scripts, Active Server Pages™, or other scripting technologies. The pre-configured service component can be referred to as an Internet enabled service component (IESC).

Once an external application has gained access to the IESC, the IESC can provide to the external applications access to an event handler in the SLEE through which service components can communicate with one another. Through this mechanism, service components executing in the SLEE also can communicate with the IESC. Thus, because the IESC can be communicatively linked to a server side program executing within a server in a computer communications network such as the Internet, other service components within the SLEE can utilize the IESC to send and receive information over the Internet. Moreover, other service components within the SLEE can be accessed by users and administrators from the Internet.

The combination of server-side programs and the IESC enable various aspects of services and service components to be accessed via the Internet through a common application programming interface (API) provided by the IESC. For example, subscribers can access and modify service attributes. Service attributes can include any subscriber accessible aspect of a service. Similarly, service administrators or super users can access, monitor, and perform administrative functions over the Internet. Administrative functions can include, but are not limited to, any functionality reserved for a system administrator or a super user and not provided to a subscriber. Notably, the IESC can provide this access to subscribers and administrators over the Internet without the aid of external services or systems.

Figure 1:
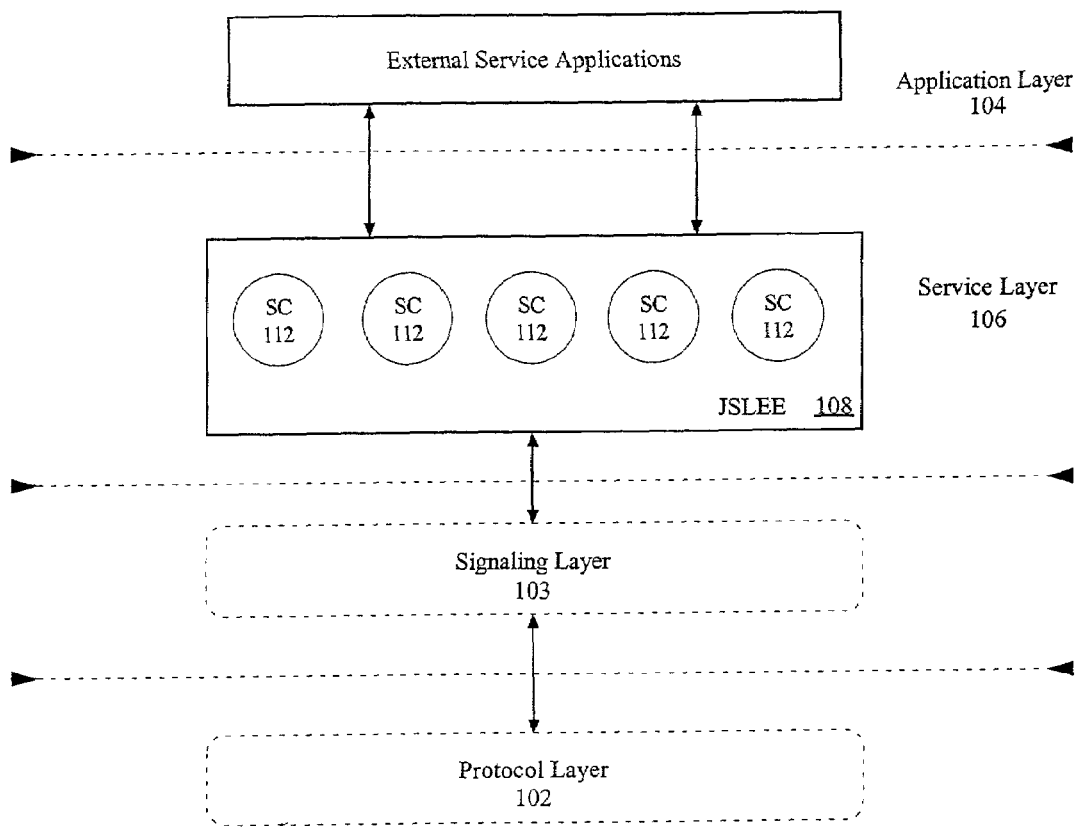
FIG. 1 is a schematic representation of an intelligent network architecture configured in accordance with a conventional JAIN implementation known in the prior art.
Figure 2:
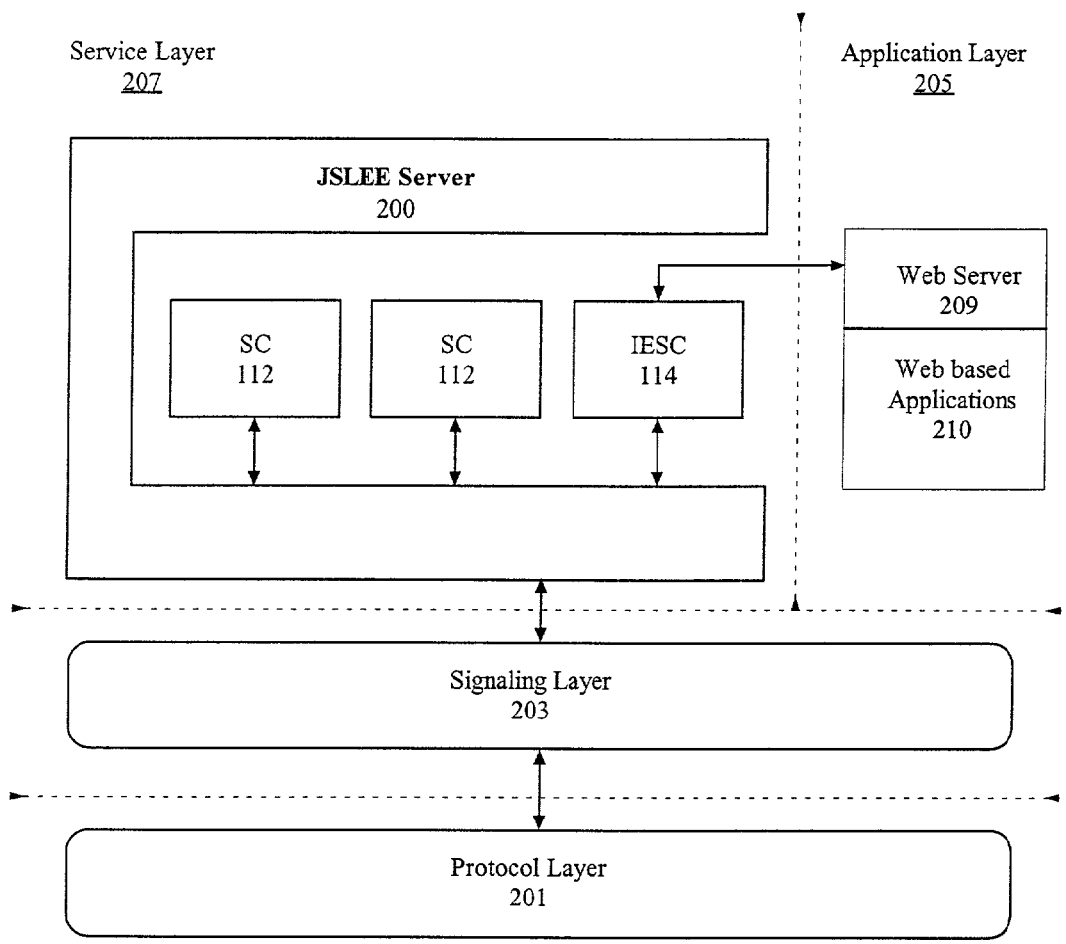
FIG. 2 is a schematic representation of an intelligent network architecture configured in accordance with the inventive arrangements disclosed herein.

FIG. 2 is a schematic illustration of a JAIN-compliant intelligent network configured in accordance with the inventive arrangements. The JAIN-compliant network can include a protocol layer 201, a signaling layer 203, an application layer 205, and a service layer 207. The application layer 205 can host external third party applications. Typical third party applications can suit mass-market demand for services such as virtual private networks (VPNs), inbound services and unified messaging. External third party applications also can include short-lived and niche applications which can be deployed using un-trusted application space deployment technologies such as database lookup interfaces, downloadable mechanisms, and the Parlay API, as are well known in the art. Notably, external applications further can include Internet service applications such as Web based applications 210, implemented at least in part using hypermedia documents, which can be contained within a Web server 209 connected to the Internet and included as part of the World Wide Web.

The Web based applications 210 further can include server side programs for accessing various aspects of service components over the Internet. For example, the server side programs can provide users with the ability to monitor and modify service attributes. As mentioned, service attributes can include any subscriber accessible aspect of services such as call forwarding, call blocking, or messaging. Examples of service attributes can include service information such as telephone numbers to be blocked, times which particular numbers can be blocked, as well as other behavioral aspects of a service such as the type of message to be played to particular calling numbers or the number of rings before the messaging service answers the telephone.

Similarly, server side programs can provide for the administration of service components from the Internet. Administrative functions can include, but are not limited to, any functionality reserved for a system administrator and not provided to a subscriber. For example, such functions can include, but are not limited to monitoring and reporting on various aspects of a service component such as service component usage, the number of users accessing a particular service component, the number of calls being processed by a service component, and monitoring a subscriber's service. Administrative functions also can include halting the execution of a service component, starting the execution of a service component, and loading and unloading a service component within the SLEE.

The service layer 207 can include a SLEE server such as a JSLEE Server 200 which can be configured for compatibility with the JAIN specification. The protocol layer 201 can include one or more protocol stacks which can be configured to interact with the service components 112 and IESCs 114 executing in the JSLEE Server 200 through a signaling layer 203. Notably, the invention is not limited in regard to the number or type of protocol stacks. Rather, JSLEE Server 200 can interact with any protocol stack, for example those protocol stacks configured in accordance with the JAIN specification.

The IESCs 114 can be configured to communicate directly with the Web Server 209 by sending and receiving requests and responses in accordance with the hyper-text transfer protocol (HTTP). Likewise, the Web server 209 can include server side programs configured to communicate with IESCs 114 also in accordance with HTTP. Notwithstanding, the invention is not limited in regard to the manner in which the IESCs and corresponding server side programs communicate. Rather, any known communication technique can suffice including general connection-oriented techniques such as explicit TCP/IP communications.

Each IESC 114, like other service components 112 in the JSLEE Server 200, also can be configured with the ability to receive events and post events to the JSLEE Server 200. In this manner, other service components 112 can be registered with the JSLEE Server 200 to receive such events. Those service components 112 can correspondingly post events to the JSLEE Server for which the IESC 114 can be registered to receive. It should be appreciated that the IESC 114 can process events received from the JSLEE Server 200 as well as communications received from the Web Server 209. In this manner, the IESC 114 can function as an interface between the Internet and the JSLEE Server 200.

The JSLEE Server 200 also can include several lifecycle management functions. In particular, the service components 112 and IESCs 114 can be properly loaded within the JSLEE Server 200 for execution. The JSLEE Server 200 can identify configuration and loading parameters associated with each service component 112 and IESC 114 to be loaded. Subsequently, the JSLEE Server 200 can execute the service components 112 and IESC 114 using the identified configuration and loading parameters. Finally, the service components 112 and the IESC 114 can register with an internal event handling component of the JSLEE Server 200 so that events can be transmitted to and from the service components 112 and IESCs 114 executing in the JSLEE Server 200.

In operation, the JSLEE Server 200 can transmit and receive events to and from the protocol stacks in the protocol layer 201. More particularly, the events can be transmitted and received in the event handling component included in the JSLEE Server 200. Likewise, service components 112 and IESCs 114 which are registered with the JSLEE Server can receive protocol stack events directed towards particular ones of the service components 112 and IESCs 114. More specifically, the event handling component can route received events to service components 112 and IESCs 114 which have registered with the JSLEE Server 200 to receive such events. The service components 112 and IESCs 114 further can post protocol stack events to the JSLEE Server 200, as well as other events.

Figure 3:
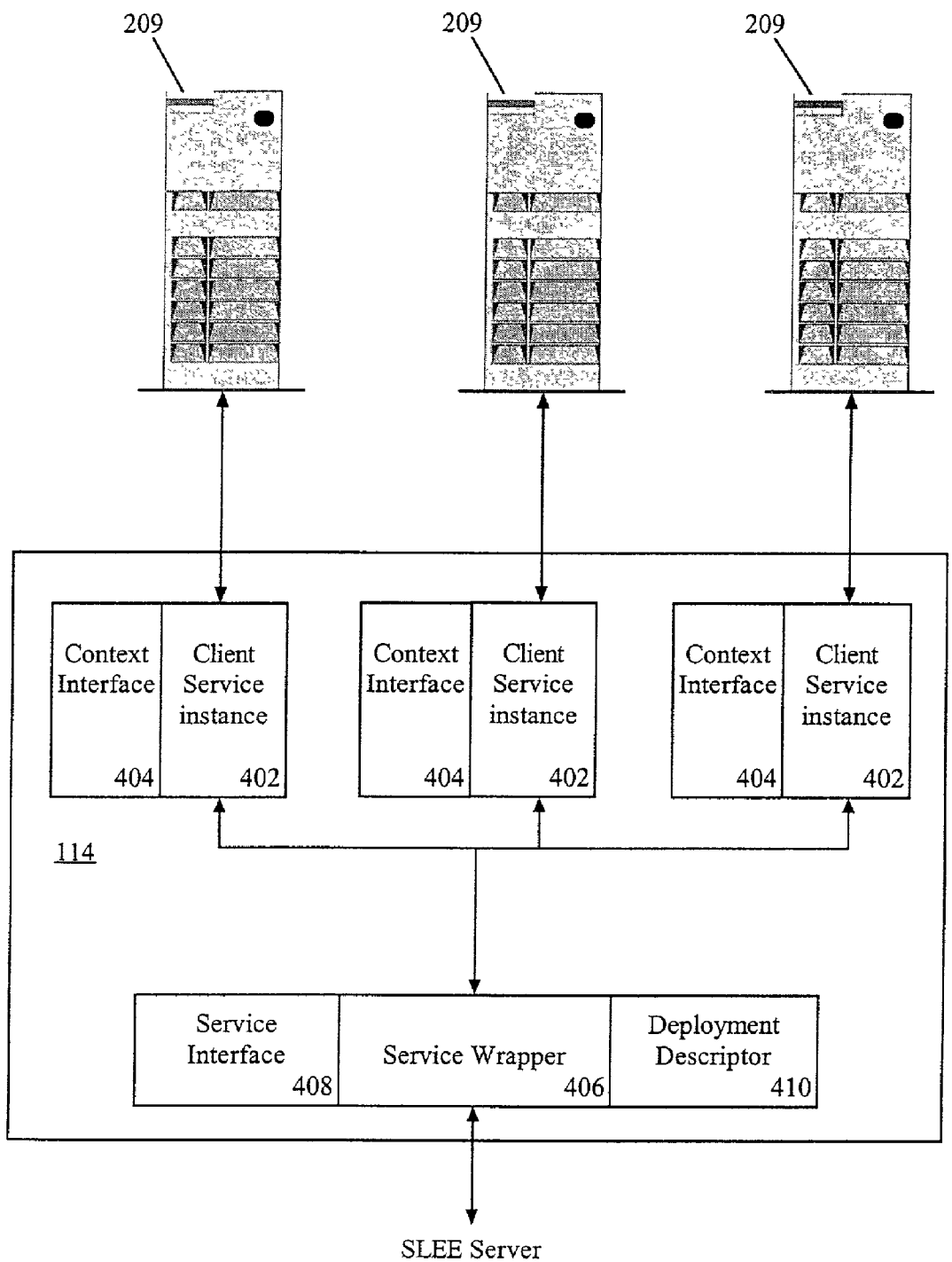
FIG. 3 is a pictorial representation of an exemplary service component for use with the intelligent network architecture of FIG. 2.

FIG. 3 is a schematic diagram illustrating the exemplary IESC 114 of FIG. 2. As shown in FIG. 3, an IESC 114 can include a service wrapper 406 and one or more client service instances 402. The client service instances 402 can be individually instantiated services. Each client service instance 402 further can register with the event routing bus of the JSLEE Server. Alternatively, the service wrapper 406 can register with the JSLEE Server to receive a particular type of event corresponding to a functionality accessible via the Internet. Accordingly, the service wrapper 406 can receive events from the JSLEE Server and process those events before routing the events to a client service instance 402. The service wrapper 406 further can process information received from the client service instance 402 and format events to be posted to the JSLEE Server. The service wrapper 406 can instantiate a client service instance 402 for each received event, or series of events comprising a transaction relating to an Internet based service application or functionality. Alternatively, a single client service instance 402 can handle multiple transactions. Thus, each client service instance 402 can interact with the Internet based service application 330. The client service instance 402 can be configured to communicate with server side programs within Web Servers 209 using HTTP requests with reference to the uniform resource locator (URL) of the Web Server 209. Similarly, the Web Servers 209, using server side programs, can communicate with the client service instances 402.

The IESC 114 also can include a deployment descriptor 410, one or more context interfaces 404, and a service interface 408. The deployment descriptor 410 can be a document, such as an XML document, which can describe the proper parameters for initially loading an instance of the IESC 114 in the JSLEE Server. The service interface 408 can publish the interface to the service wrapper 406 to external objects. Notably, the service interface 408 can be included as part of an XML document. Also, the interface to each client service instance 402 can be included as part of a context interface 404, which also can be published as part of an XML document.

The present invention can be realized in hardware, software, or a combination of hardware and software. An IESC for accessing a SLEE from a server side program according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. An advanced intelligent network comprising:
   a service logic execution environment (SLEE), said SLEE comprising an event handler for routing messages between and among client components and service components, wherein said SLEE is configured for compatibility with a JAVA APIs for Integrated Networks (JAIN) specification, wherein said SLEE is included within a service layer of a JAIN-compliant network, said JAIN-compliant comprising said service layer, a protocol layer, an application layer, and a signaling layer;
   at least one service component configured to post and receive messages to and from other service components in said SLEE through said event handler, wherein said at least one service component is a JAIN compliant component; and
   at least one Internet enabled service component (IESC) executing in said SLEE, said IESC configured to post and receive messages to and from other service components in said SLEE through said event handler, said IESC communicatively linked to a server side program external to said SLEE, wherein said IESC is a JAIN compliant component, and wherein the IESC provides the server side program with access to the event handler of the SLEE.

2. In a telephony environment having a service logic execution environment (SLEE), an Internet enabled service component (IESC) for use with the SLEE, said IESC comprising:
   at least one client service instance, each said client service instance corresponding to an Internet service application; and
   a service wrapper, said service wrapper providing a common interface to said at least one client service instance for routing events between the SLEE and said at least one client service instance, wherein said IESC is an interface between said SLEE and said at least one client service instance, wherein said SLEE is configured for compatibility with a JAVA APIs for Integrated Networks (JAIN) specification, wherein said SLEE is included within a service layer of a JAIN-compliant network, said JAIN-compliant comprising said service layer, a protocol layer, an application layer, and a signaling layer, wherein said IESC is a JAIN compliant component.

3. The IESC of claim 2, said service wrapper further comprising a deployment descriptor for providing configuration information to the SLEE.

4. The IESC of claim 2, said service wrapper further comprising a service interface for publishing an interface to said IESC.

5. The IESC of claim 2, said service wrapper further comprising a protocol stack for managing communications in the telephony environment.

6. The IESC of claim 2, said at least one client service instance further comprising a content interface for publishing an interface to said client service instance.

7. The IESC of claim 2, wherein said IESC interacts with other generic service components, external applications, service components, or protocol stacks.

8. A method for providing an external interface to a service logic execution environment (SLEE) comprising an event handler for routing messages between service components executing in the SLEE, said method comprising the steps of:
- an Internet enabled service component (IESC) registering with the SLEE;
- said IESC receiving a first event routed by the SLEE, said first event corresponding to an Internet service application which the IESC has registered to receive from the SLEE, wherein said SLEE is configured for compatibility with a JAVA APIs for Integrated Networks (JAIN) specification, wherein said SLEE is included within a service layer of a JAIN-compliant network, said JAIN-compliant comprising said service layer, a protocol layer, an application layer, and a signaling layer, wherein said IESC is a JAIN compliant component, and wherein the IESC provides the Internet service application with access to the event handler of the SLEE.

9. The method of claim 8, further comprising:
establishing a communications link between said IESC and said Internet service application.

10. The method of claim 8, further comprising:
instantiating at least one client service instance for communicating with said Internet service application, said client service instance interacting with said Internet service application.

11. The method of claim 10, further comprising:
posting a second event to the SLEE responsive to said interaction between said client service instance and said Internet service application, said second event corresponding to said interaction.

12. The method of claim 8, wherein said first event is from a protocol stack.

13. The method of claim 8, wherein said first event is from a generic service component.

14. The method of claim 8, wherein said first event is from a service component.

15. The method of claim 8, wherein said first event is from an external server side program associated with said Internet service application.

16. A machine readable storage, having stored thereon a computer program having a plurality of code sections executable by a machine for causing the machine to perform the steps of:
- an Internet enabled service component (IESC) registering with a service logic execution environment (SLEE), the SLEE comprising an event handler for routing messages between service components executing in the SLEE;
- said IESC receiving a first event routed by the SLEE, said first event corresponding to an Internet service application which the IESC has registered to receive from the SLEE, wherein said SLEE is configured for compatibility with a JAVA APIs for Integrated Networks (JAIN) specification, wherein said SLEE is included within a service layer of a JAIN-compliant network, said JAIN-compliant comprising said service layer, a protocol layer, an application layer, and a signaling layer, wherein said IESC is a JAIN compliant component, wherein the IESC provides the Internet service application with access to an event handler of the SLEE.

17. The machine readable storage of claim 16, further comprising:
establishing a communications link between said IESC and said Internet service application.

18. The machine readable storage of claim 16, further comprising:
instantiating at least one client service instance for communicating with said Internet service application, said client service instance interacting with said Internet service application.

19. The machine readable storage of claim 18, further comprising:
posting a second event to the SLEE responsive to said interaction between said client service instance and said Internet service application, said second event corresponding to said interaction.

20. The method of claim 16, wherein said first event is from a protocol stack.

21. The method of claim 16, wherein said first event is from a generic service component.

22. The method of claim 16, wherein said first event is from a service component.

23. The meted of claim 16, wherein said first event is from an external server side program associated with said Internet service application.

* * * * *